2,868,707

PROCESS OF MAKING A NEUTRONIC REACTOR FUEL ELEMENT COMPOSITION

Henry Ward Alter, Danville, Calif., and John K. Davidson, Richard S. Miller, and Jack L. Mewherter, Schenectady, N. Y., assignors to the United States of America as represented by the United States Atomic Energy Commission No Drawing. Application June 4, 1957
Serial No. 663,552

1 Claim. (Cl. 204—193.2)

The present invention relates to a process for making a composition of matter useful as a fuel element in neutronic reactors generally and more particularly power reactors of the solid fuel type. Heretofore, reactors of this general type have had massive fuel elements fabricated from massive metal used in their construction. Fuel elements made of massive metal have the disadvantage that due to the particular metallurgical characteristics of the metal it is difficult to work and after the fuel has served its period of usefulness in the reactor reprocessing is difficult and a tedious series of chemical manipulations.

One object of the present invention is the preparation of a novel composition of matter from which reactor fuel elements may be fabricated.

Another object is a simple process for making a reactor fuel of uniform composition.

Still another object is the formulation of a reactor fuel material which can be more readily reprocessed after its usefulness as a fuel element has been served.

Other and further objects will be apparent to those skilled in the art upon reading the following disclosure.

The compositions of the present invention may be used in any of the various types of reactors which employ a solid material as the fuel element.

In general the compositions of the present invention consist of a solid solution of $PuO_2$ in $UO_2$ in a ratio of 2 to 99 parts of $UO_2$ to one part of $PuO_2$. Insofar as this invention is concerned the use of the term uranium or the oxide of uranium ($UO_2$) is meant to imply either natural uranium, or uranium enriched in $U^{235}$, or uranium depleted in the isotope $U^{235}$. Reactors are classified as fast, intermediate or slow depending upon the extent to which the average energy of the fission neutrons is reduced prior to capture resulting in fission. For use in fast reactors the ratio of $UO_2$ to $PuO_2$ in the compositions of the present invention should be in the range of 2–9 parts of $UO_2$ to 1 part of $PuO_2$, the preferred range being from 2–5 parts of $UO_2$ to 1 part of $PuO_2$. The higher ratios of $UO_2$ to $PuO_2$ are quite suitable for use in intermediate and slow reactors. Broadly, the mixed oxide powder is produced from uranyl nitrate-Pu IV nitrate solutions mixed in the desired U—Pu ratio. U and Pu are precipitated together from the nitrate solutions by the addition of ammonium hydroxide. The acetone dried precipitate consisting of ammonium diuranate and hydrated plutonium dioxide is then calcined at 600–1000° C. in an atmosphere of hydrogen for a period of from one to two hours. The resulting product, shown by X-ray diffraction and nitric acid dissolution behavior to be a solid solution of $PuO_2$ in $UO_2$, is a readily friable material which can be pelletized for fuel element fabrication or charged directly into a suitable length of a stainless steel tube of from 1/16" to 3/8" internal diameter and enclosed as an individual fuel element. After employment in a reactor the spent fuel (approximately 50% burnup of the original Pu) is readily dissolved in hot nitric acid and upon dilution with water the resulting solution qualifies for the feed stream of a solvent extraction process for product recovery and fission product decontamination.

When it is desired to have the fuel material in pellet form, the mixed oxide as received from the calcinatory is first ground to powder of fairly uniform particle size and then charged to a single acting die of suitable internal diameter where the material is compressed to approximately 65% of theortical density. To prevent possible contamination of the fuel by impurities, no die lubricant is used in this operation. The finished pellets possess excellent handling properties. In construction a fuel element unit, a predetermined length of stainless steel tubing of desired internal diameter is closed by welding a stainless steel plug at one end. A magnesium oxide insulating pellet in then placed in the tube and positioned at the closed end thereof. The tube is then filled with $UO_2$—$PuO_2$ pellets leaving space for another magnesium oxide insulating pellet and an end plug. After the second magnesium oxide pellet and end plug are inserted in the tube, the second end plug is tack welded in place and the assembly is alternatively evacuated and flushed with helium until a good helium atmosphere is established in the tube. The welding of the second end closure is then completed and the unit is checked by helium accumulation leak testing. Units in which helium leaks are detected are disassembled and reassembled.

The particular advantages of the present invention are: the simplicity of formation of the fuel composition as generally outlined above and the ease of unit fuel element fabrication. Pelletizing the fuel increases the ease of handling the material and reduces the health hazard associated with the handling of dry powdered plutonium compounds.

One specific example of making the compositions of the present invention is as follows:

Example I 98.76 ml. were drawn into a precipitator from a stock solution of uranium nitrate hexahydrate 0.4760 M in UNH, then 11.75 ml. of plutonium (IV) nitrate were drawn into the precipitator form a stock solution of plutonium nitrate 0.7670 M in plutonium. The resulting solution was thoroughly agitated with a stirrer and then 100 ml. of chemically pure acetone was added and the liquid again thoroughly agitated. Dry ammonium gas ($NH_3$) was then bubbled through the solution with continued stirring until precipitation was completed. The precipitate was allowed to settle and was then drawn off into a combination filter and calcining reactor, in which it was washed with three separate 100 ml. volumes of C. P. acetone. The precipitate was then thoroughly dried in a current of air. The precipitate analyzed as a mixture of ammonium diuranate and hydrated plutonium dioxide. The calcinatory was then connected to a tank of dry hydrogen and a current of hydrogen was passed over the precipitate until all of the air was displaced. After which heat was applied while maintaining the flow of hydrogen at between 300–600 ml./min. until a temperature of 980° C. was attained. The temperature in the reactor was maintained at approximately 980–1000° C. for two hours after which the apparatus was permitted to cool to room temperature. The atmosphere of hydrogen was then displaced with an atmosphere of nitrogen after which the calcined material weighing 15.13 grams, was removed from the appartus and crushed.

Having thus described our invention what we claim is:

A process for making a solid solution of $PuO_2$ in $UO_2$ which comprises precipitating ammonium diuranate-hydrated plutonium dioxide from an aqueous nitric acid solution containing hexavalent uranium ions and tetravalent plutonium ions by means of ammonium hydroxide, filtering off the precipitate, washing the precipitate with acetone, drying the precipitate and calcining the dried precipitate at a temperature within a range of 600–1000° C. for at least one hour.

References Cited in the file of this patent

UNITED STATES PATENTS

| | | |
|---|---|---|
| 2,499,729 | Daussan | Mar. 7, 1950 |
| 2,584,475 | Lecuir | Feb. 5, 1952 |
| 2,798,848 | Kingdon | July 9, 1957 |
| 2,799,642 | Hurwitz et al. | July 16, 1957 |

OTHER REFERENCES

KAPL–1446, Nov. 18, 1955, pp. 9, 11. Available from AEC Technical Information Service, Oak Ridge, Tenn., @ 35¢.